United States Patent
Mudry et al.

(10) Patent No.: US 9,169,006 B2
(45) Date of Patent: Oct. 27, 2015

(54) METHOD OF MANAGING PARKING BRAKING IN A BRAKING SYSTEM FOR A VEHICLE FITTED WITH ELECTRIC BRAKES

(75) Inventors: Stéphane Mudry, Issy-les-Moulineaux (FR); Frédéric Ragot, Billancourt (FR); Jean-Baptiste Vaney, Paris (FR); Emmanuel Colin, Paris (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 1011 days.

(21) Appl. No.: 12/977,446

(22) Filed: Dec. 23, 2010

(65) Prior Publication Data

US 2011/0160975 A1    Jun. 30, 2011

(30) Foreign Application Priority Data

Dec. 24, 2009    (FR) ..................... 09 59587

(51) Int. Cl.

| | |
|---|---|
| *B60T 8/172* | (2006.01) |
| *B64C 25/44* | (2006.01) |
| *B60T 7/04* | (2006.01) |
| *B60T 7/08* | (2006.01) |
| *B60T 7/10* | (2006.01) |
| *B60T 8/17* | (2006.01) |
| *B60T 13/74* | (2006.01) |

(52) U.S. Cl.
CPC ............... *B64C 25/44* (2013.01); *B60T 7/042* (2013.01); *B60T 7/045* (2013.01); *B60T 7/085* (2013.01); *B60T 7/107* (2013.01); *B60T 8/1703* (2013.01); *B60T 13/74* (2013.01); *B60T 13/741* (2013.01)

(58) Field of Classification Search
CPC ....... B64C 25/44; B60T 8/1703; B60T 7/107; B60T 7/042; B60T 7/085; B60T 13/741; B60T 7/045; B60T 13/74
USPC .......................................................... 701/70
See application file for complete search history.

(56) References Cited

U.S. PATENT DOCUMENTS

| | | | |
|---|---|---|---|
| 2004/0090117 A1* | 5/2004 | Dudeck et al. ................. | 303/191 |
| 2005/0077783 A1* | 4/2005 | Suzuki et al. ................... | 303/89 |
| 2007/0084682 A1* | 4/2007 | Griffith et al. ................. | 188/156 |
| 2008/0147286 A1* | 6/2008 | Goss et al. ...................... | 701/70 |

FOREIGN PATENT DOCUMENTS

| | | |
|---|---|---|
| DE | 103 61 042 B3 | 5/2005 |
| EP | 1 391 362 A1 | 2/2004 |
| WO | 2008/049798 A2 | 5/2008 |

\* cited by examiner

*Primary Examiner* — Redhwan k Mawari
*Assistant Examiner* — Rodney P King
(74) *Attorney, Agent, or Firm* — Sughrue Mion, PLLC

(57) ABSTRACT

The invention relates to a method of managing parking braking in a braking system for a vehicle fitted with at least one electric brake including at least one electric actuator having a pusher actuated by an electric motor for selectively applying a force against friction elements of the brake, the method comprising the steps of:
  establishing a series of direct adjustment tables for parking braking, corresponding to braking situations at different energy levels;
  when applying parking braking, selecting a direct adjustment table corresponding to a braking situation preceding the application of parking braking; and
  directly adjusting a parking braking force in application with the selected direct adjustment table.

4 Claims, 2 Drawing Sheets

METHOD OF MANAGING PARKING BRAKING IN A BRAKING SYSTEM FOR A VEHICLE FITTED WITH ELECTRIC BRAKES

The invention relates to a method of managing parking braking in a braking system for a vehicle fitted with electric brakes.

BACKGROUND OF THE INVENTION

Electric brakes for a vehicle, in particular an aircraft, generally comprise at least one electric actuator having a pusher actuated by an electric motor for selectively applying a force against friction elements of the brake.

In order to block the vehicle, e.g. when it is stationary on a parking space, the pusher of the actuator is put into a position in which it exerts a controlled force on the friction element, and then the pusher is blocked in this position so that it continues to exert a parking force on the friction elements, thereby allowing the power supply to the motor to be switched off and thus reducing the electrical power consumption of the brake.

Nevertheless, given the dimensional variations of the components of a brake as a function of temperature, the parking force varies over time, and it is therefore necessary to provide for adjusting the position of the pusher.

In particular from documents U.S. Pat. No. 6,959,794 and FR 2 880 603, it is known to adjust the applied parking force at given instants, either by using a force sensor mounted in one of the components of the braking system and ensuring that the force is maintained at a constant value by means of a closed loop acting on the position of the pusher as a function of the value of the force, or else by implementing a so-called "return-to-zero" method including the steps of unblocking the pusher, retracting the pusher to zero force, and then advancing it once more until it exerts the required force as measured from one of the operating parameters of the actuator, e.g. the power supply current drawn by the electric motor of the actuator.

Those two means consume electricity, and that can pose a problem insofar as when parked, the braking system is powered solely from the vehicle battery.

Above-mentioned document U.S. Pat. No. 6,959,794 also discloses adjusting the position of the pusher in compliance with a so-called "direct adjustment" table that causes the position of the pusher to be varied as a function solely of the length of time that has elapsed since the parking brake was applied. In order to ensure that the parking brake remains effective regardless of circumstances, it is then necessary for the adjustment table to correspond to compensating for the effects of emergency braking, i.e. a situation in which the components are subjected to a large amount of expansion shortly after applying the parking brake. This expansion gives rise in particular to very considerable lengthening of the torsion tube that carries the disks. With the pusher locked in a position that is stationary relative to the torsion tube, a lengthening of the torsion tube gives rise to a reduction in the braking force. In order to compensate for this reduction, it is therefore necessary to provide a direct adjustment table that causes the pusher to be moved considerably in the tightening direction.

Since the adjustment is the same regardless of the circumstances preceding application of the parking brake, there is a risk in certain circumstances of performing adjustments too frequently or at too high a level, such that the adjustments are of no use, particularly after braking at very low energy levels in which the thermal expansion of the torsion tube is small. These useless adjustments contribute to prematurely aging the actuators.

OBJECT OF THE INVENTION

An object of the invention is to provide a method of managing parking braking so as to guarantee a parking braking force while minimizing the risk of premature aging of the actuator.

BRIEF DESCRIPTION OF THE INVENTION

In order to achieve this object, the invention provides a method of managing parking braking in a braking system for a vehicle fitted with at least one electric brake including at least one electric actuator having a pusher actuated by an electric motor for selectively applying a force against friction elements of the brake, wherein the method comprises the steps of:
  establishing a series of direct adjustment tables for parking braking, corresponding to braking situations at different energy levels;
  when applying parking braking, selecting a direct adjustment table corresponding to a braking situation preceding the application of parking braking; and
  directly adjusting a parking braking force in application with the selected direct adjustment table.

Thus, by selecting the adjustment table as a function of preceding braking, it is possible to apply the adjustment that ensures that some minimum for the parking braking force is complied with, while avoiding the risk of subjecting the brake to high levels of force as the brake cools down, thereby contributing to lengthening the lifetime of the actuators. In particular, advantage is taken of the reduction in the frequency of the adjustments and/or in the force level of each adjustment after braking operations have been performed at low intensity, thereby giving rise to small thermal expansions only.

In a first implementation of the method of the invention, a direct adjustment table is selected in association with a history of braking operations performed over a period of time preceding application of the parking brake. This therefore makes it possible to anticipate accurately the dimensional variations of the braking structure.

In a second implementation of the method of the invention, the method comprises the steps of:
  selecting a first direct adjustment table and applying it for a predetermined initial application time;
  making a first adjustment;
  comparing a real change in position of the pusher with a theoretical change in position of the pusher obtained from the direct adjustment tables after an application time equal to the initial application time; and
  selecting a second direct adjustment table for which the theoretical change in position of the pusher is the closest to the real change in position.

Thus, the second direct adjustment table is selected by means of a comparison with real data that takes account of all of the particular features of the braking system under consideration.

In another aspect of the invention, applicable to both of the above-described implementations, for each braking operation at a given energy level, different direct adjustment tables are drawn up as a function of different ambient temperatures, and when a direct adjustment table is selected, account is taken of ambient temperature.

BRIEF DESCRIPTION OF THE DRAWINGS

The invention can be better understood in the light of the following description with reference to the figures of the accompanying drawings, in which.

DETAILED DESCRIPTION OF THE INVENTION

Figure 1:
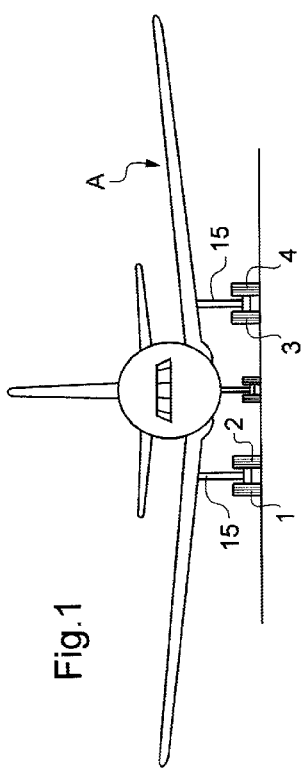
FIG. 1 is a diagrammatic view of an aircraft having a plurality of braked wheels.

The method of the invention is described in detail herein in application to an aircraft A such as that shown in FIG. 1, which aircraft has four braked wheels numbered 1 to 4 carried by undercarriages 15. Naturally, the invention applies to an aircraft having any number of braked wheels.

Figure 2:
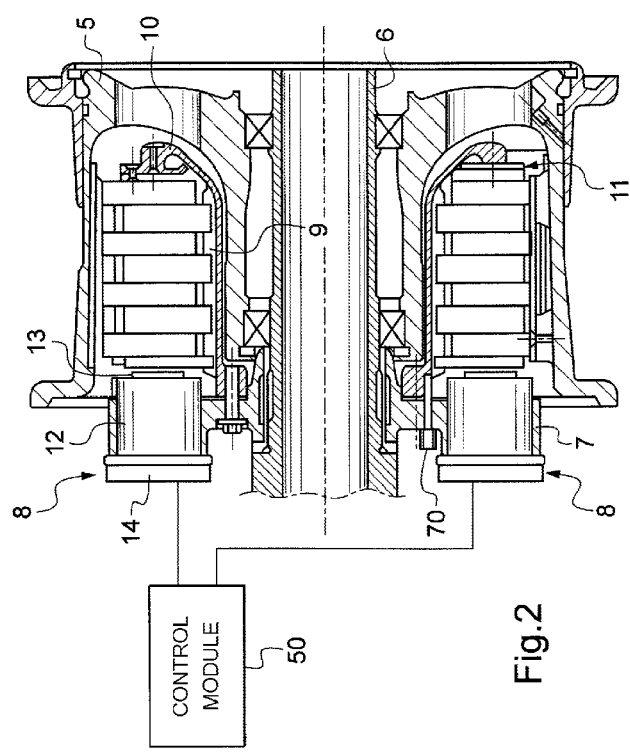
FIG. 2 is a section view of a wheel fitted with a brake having electrical actuators.

One of the braked wheels is shown in FIG. 2. Each wheel has a rim 5 adapted to receive a tire (not shown) and mounted to rotate on an axle 6 carried by one of the undercarriages 15 of the aircraft. A ring 7 carrying actuators 8 is mounted on the axle 6. The ring 7 has a torsion tube 9 fastened thereto, which tube extends inside the rim 5 and terminates in an abutment 10. The ring 7, and thus the torsion tube 9, are prevented from rotating relative to the axle 6 by stop means (not shown).

Between the abutment 10 and the actuators 8 there extends a stack of disks 11 made up of rotors that are constrained to rotate with the rim 5, and stators that are constrained to rotate with the torsion tube 9.

Each of the actuators 8 comprises a body 12 in which a pusher 13 is mounted facing the stack of disks 11 and so as to move linearly under drive from an electric motor contained in the body 12, thereby applying a controlled pressure force on the stack of disks 11 so as to induce friction forces between the rotors and the stators of the stack of disks and thus contribute to slowing down rotation of the rim 5, and thus to brake the aircraft A.

Each of the actuators 8 includes a blocking member 14 adapted to block the pusher 13 in the position in which it is to be found when the blocking member 14 is activated. The braking system includes a control module 50 suitable for causing the brake actuators 8 to operate either in a controlled mode in which each actuator is controlled selectively to apply a force against the associated stack of disks 11 in response to a braking setpoint, or else in a parking mode in which the actuators 8 are blocked in a position by means of the blocking member 14 so that the pusher 13 exerts a parking force on the associated stack of disks 11. In parking mode, the parking force is thus held without assistance from an electric motor, thus making it possible to switch off the electrical power supply thereto.

In order to switch to parking mode, when the aircraft is in a parking place, the control module 50 begins by controlling the pushers 13 of the actuators 8 so that they apply against the associated stack of disks 11 a controlled force that is equal to a nominal parking force, and it then activates the blocking members 14 in order to block the pushers 13. The power supply to the electric motors of the actuators can then be switched off. The pushers 13 blocked in this way continue to exert on the stacks of disks 11 a parking force that prevents the aircraft from moving.

Nevertheless, as mentioned in the introduction, the relative expansion of the components of the braking system, in particular the relative expansion of the torsion tube 9 and of the disks 11 gives rise to variations in the force that is actually applied.

Figure 3:
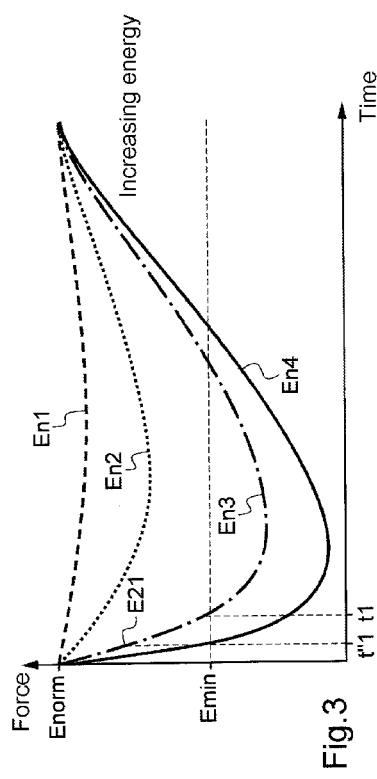
FIG. 3 is a graph showing variation over time in the parking force of an actuator without adjustment for various braking energy levels.

FIG. 3 shows these variations in the form of four curves En1, En2, En3, and En4 that correspond to increasing energy levels for the braking that immediately preceded applying the parking brake. For example, curve En1 corresponds to braking with a low level of energy, e.g. during movements performed at slow speed and mainly involving final braking so as to bring the vehicle to rest. Curve En2 corresponds to braking with an energy level that is a little higher, e.g. during movements performed at slow speed with nothing more than successive braking operations prior to coming to rest. Curve En3 corresponds to braking at a high level of energy, e.g. when the vehicle is brought to rest several times over in a short period of time. Curve En4 corresponds to braking at a maximum energy level, as can occur when the vehicle is stopped suddenly while it was traveling at full speed.

On the graph in FIG. 3, there can be seen the variations over time in the parking force E exerted by one of the actuators 8 on the associated stack of disks 11. Time t0 corresponds to the moment when the pusher 13 of the actuator is blocked by the blocking member 14 in a position in which it exerts a force equal to the nominal parking force Enom. As explained above, the parking force E tends to decrease under the effect of expansion. In the example shown in FIG. 3, the braking curve for energy levels En1 and En2 remain between the required minimum force value Emin and the nominal parking force value Enom. In these two situations there is therefore no need to make an adjustment. In contrast, concerning parking braking curves En3 and En4, if the parking force is allowed to vary as dictated by expansion, it can be seen from FIG. 3 that it will drop below some minimum value Emin that is needed to prevent the vehicle from moving.

According to the invention, a series of direct adjustment tables are established for parking braking, corresponding to braking situations at different energy levels. Each direct adjustment table comprises, at determined instants, a direct correction to be applied to the position of the pusher so as to bring the force of the parking brake to a value that is close to or equal to the nominal force Enom in the direction for increasing the parking braking force because the adjustment needs to compensate for a reduction in parking braking force as a result of brake expansion, and so as to bring the parking braking force to a value that is close to or equal to the minimum force Emin when reducing the parking braking force because the adjustment needs to compensate for an increase in the parking braking force as a result of brake shrinkage.

Figure 4:
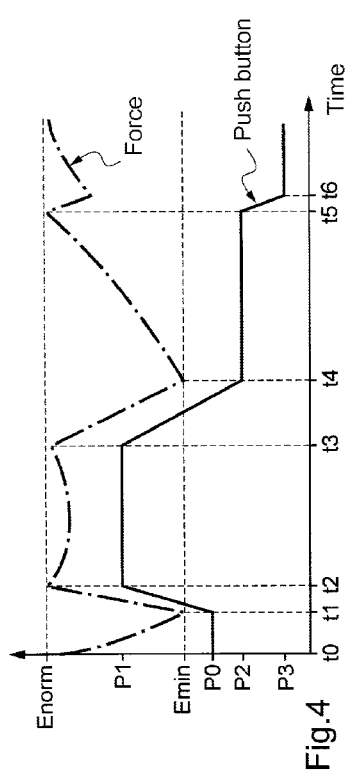
FIG. 4 is a graph showing how a direct adjustment table is prepared.

By way of example, FIG. 4 shows how a direct adjustment table is prepared for the parking braking curve corresponding to energy level En3. In this figure, the variation in the position of the pusher is represented by a continuous line while the corresponding variation in the parking braking force is represented as a chain-dotted line.

At the initial instant t0, the pusher is in a position P0 that corresponds to a nominal parking braking force Enom. From the force curve of FIG. 3, an instant t1 is determined at which the force curve reaches the minimum force level Emin. A command is inserted in the direct adjustment table so that at this instant the pusher is operated to increase force until the pusher reaches the position P1 at which the parking braking force is equal to the nominal force Enom. This position is reached at instant t2 after which variation in the parking braking force continues in application of the corresponding portion of the curve En3 in FIG. 3.

From the curve En3 in FIG. 3, an instant t3 is determined such that, given the shape of the curve in FIG. 3, the parking braking force reaches the nominal value Enom again. A command is inserted in the direct adjustment table so that at this instant the pusher is retracted so as to reach a position P2 at which the parking braking force reaches the minimum value Emin. This position is reached at instant t4 from which the variation in the parking braking force continues in compliance with the corresponding portion of curve En3 in FIG. 3.

A new command for retracting the pusher is inserted in the direct adjustment table at instant t5 at which the parking braking force once more reaches the nominal value Enom. At this instant, the pusher is once more retracted at an instant t6 in which it reaches a position P3, which is just sufficient for the parking braking force to be returned to a value such that when the temperature of the brake has become stable, the parking braking force is substantially equal to the nominal force Enom.

For reasons of clarity in the drawing, the time differences between the instants t1-t2, t3-t4, and t5-t6 are deliberately exaggerated in FIG. 4.

A direct adjustment table is established in analogous manner for the various different braking energy levels. Preferably, for each different braking energy level, direct adjustment tables are drawn up for different ambient temperatures.

According to the invention, the method of managing a parking brake comprises, while applying a parking braking force, a step of selecting a direct adjustment table corresponding to the braking situation preceding application of the parking brake, and then directly adjusting the parking braking force in compliance with the selected direct adjustment table.

In a preferred, first implementation of the method, a history is established of the braking energy levels implemented prior to applying the parking brake, and an adjustment table is selected as a function of said braking history, preferably while also taking account of ambient temperature. For this purpose, the vehicle is preferably fitted with a temperature probe 70. When the braking history determines an energy level that is intermediate between two direct adjustment tables, then the direct adjustment is preferably performed in compliance with the direct adjustment table for the energy level that is immediately higher.

Figure 5:
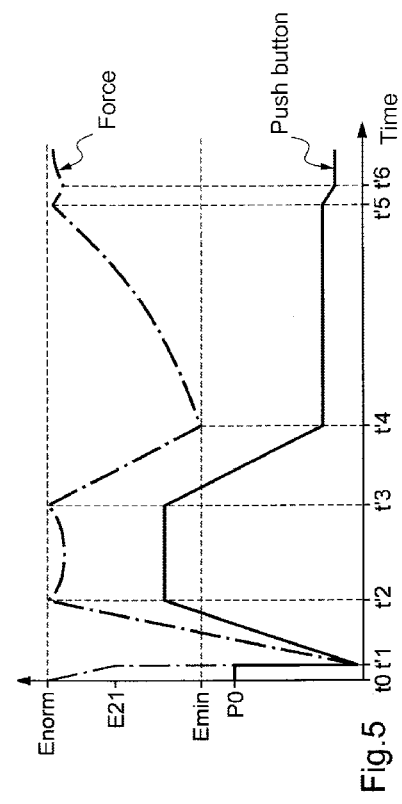
FIG. 5 is a graph showing variation over time in the position of the pusher and in the corresponding parking force of an actuator in the second implementation of the method of the invention.

FIG. 5 shows a second implementation of the method of the invention. In this implementation, a first direct adjustment table, preferably a high energy level table and more precisely the direct adjustment table for the highest energy level, is selected and applied during an initial predetermined application time. The first table may be selected by means of the first implementation as described above.

In the example shown in FIG. 5, the first direct adjustment table as selected corresponds to the curve for braking at energy level En4 in FIG. 3 and the initial application time is the time that extends between instant t0 and instant t'1 at which the parking braking force is equal to the minimum force Emin (see FIG. 3). In the example shown, for which braking conditions prior to applying the parking brake correspond to the curve for energy level En3, the parking braking force actually reached is the force E21 given by energy curve En3.

At this instant, a first adjustment is made, for example by a return-to-zero method, i.e. comprising the steps of:
  unblocking the pusher 13;
  reversing the pusher 13 until it is no longer in contact with the stack of disks 11; and
  advancing the pusher 13 to a position at which the parking braking force reaches the nominal value Enom, as shown by instant t'2 in FIG. 5. The real change in position of the pusher is then compared with the theoretical changes in position as they appear from the direct adjustment tables after an application time equal to the initial application time. The second direct adjustment table to be selected is the table for which the real change in position of the pusher is identical to the theoretical change in position. Thereafter, direct adjustments are performed using the direct adjustment table as selected in this way, and as shown in FIG. 5.

The above-described method may be applied to all of the actuators of the aircraft, either one by one, or simultaneously. Nevertheless, when applied simultaneously, care should be taken to ensure that the total force generated by all of the actuators of the aircraft does not drop below a minimum which would run the risk of allowing the aircraft to move.

Naturally, the invention is not limited to the implementations described and various implementations may be applied thereto without going beyond the ambit of the invention as defined by the claims. In particular, the method of the invention is applicable to brakes having actuators that are servo-controlled in position. To exert a parking force E on an actuator of that type, the pusher 13 is brought into contact with the stack of disks 11, the contact position of the pusher 13 noted, and the pusher 13 is moved from said contact position through a given distance corresponding to the desired controlled force, given a value for the stiffness of the brake.

Although it is stated that during an adjustment step the parking force is raised to its nominal level, it is possible to implement other strategies such as raising the parking force to a level that is slightly greater than the nominal force so as to reduce the number of adjustment steps. Conversely, instead of preparing the adjustment tables with reference to the nominal force Enom, it is possible to envisage making adjustments to a force that is intermediate between Enom and Emin, even through that increases the frequency with which adjustments are made. Adjustments made at high force (Enom) are more likely to damage the actuator than more numerous adjustments made at lower force.

It is also possible to provide different direct adjustment tables as a function of the weight of the vehicle, with the minimum force threshold being lowered when the vehicle is empty or only partially loaded.

What is claimed is:

1. A method of managing parking braking in a braking system for a vehicle fitted with at least one electric brake including at least one electric actuator having a pusher actuated by an electric motor for selectively applying a force against friction elements of the brake, the method comprising executing on a controller the steps of:
  establishing a series of direct adjustment tables for parking braking, corresponding to braking situations at different energy levels;
  establishing a braking history of braking operations performed prior to applying parking braking;
  when applying parking braking, selecting a direct adjustment table corresponding to a braking situation preceding the application of parking braking as a function of the braking history; and
  directly adjusting a parking braking force in application with the selected direct adjustment table.

2. A method according to claim 1, wherein the braking history is a history of braking energy levels.

3. A method according to claim 2, wherein when the braking history determines an energy level that is intermediate between two direct adjustment tables, direct adjustment is performed in application of the direct adjustment table having the immediately higher energy level.

4. A method according to claim 1, comprising the steps of:
- establishing for each braking energy level different direct adjustment tables as a function of ambient temperature; and
- selecting the direct adjustment table as a function of the measured ambient temperature when applying the parking braking.

* * * * *